US011460439B2

(12) United States Patent
DeBord et al.

(10) Patent No.: US 11,460,439 B2
(45) Date of Patent: Oct. 4, 2022

(54) VOLTAGE CONTROL FOR TRAVELING WAVE CHARACTERISTIC VARIATION

(71) Applicant: MOBILion Systems, Inc., Chadds Ford, PA (US)

(72) Inventors: John Daniel DeBord, West Grove, PA (US); Ahmed M. Hamid, Exton, PA (US); Liulin Deng, Chester Springs, PA (US)

(73) Assignee: MOBILion Systems, Inc., Chadds Ford, PA (US)

( * ) Notice: Subject to any disclaimer, the term of this patent is extended or adjusted under 35 U.S.C. 154(b) by 106 days.

(21) Appl. No.: 17/021,853

(22) Filed: Sep. 15, 2020

(65) Prior Publication Data

US 2021/0080429 A1    Mar. 18, 2021

Related U.S. Application Data

(60) Provisional application No. 62/901,177, filed on Sep. 16, 2019.

(51) Int. Cl.
*H01J 49/00* (2006.01)
*G01N 27/622* (2021.01)
*G01N 27/66* (2006.01)

(52) U.S. Cl.
CPC .......... *G01N 27/622* (2013.01); *G01N 27/66* (2013.01)

(58) Field of Classification Search
CPC ........ H01J 49/00; H01J 49/0027; H01J 49/02; H01J 49/022; H01J 49/06; H01J 49/061; H01J 49/062; H01J 49/063; H01J 49/065; H01J 49/066; G01N 27/622; G01N 27/66

USPC ................. 250/281, 282, 283, 286
See application file for complete search history.

(56) References Cited

U.S. PATENT DOCUMENTS

| | | | |
|---|---|---|---|
| 2004/0031920 A1* | 2/2004 | Giles ................... | G01N 27/622 250/287 |
| 2009/0014641 A1 | 1/2009 | Bateman et al. | |
| 2015/0276676 A1 | 10/2015 | Jiang et al. | |
| 2016/0126083 A1* | 5/2016 | Hoyes .................. | H01J 49/065 250/282 |
| 2017/0076931 A1 | 3/2017 | Ibrahim et al. | |

(Continued)

FOREIGN PATENT DOCUMENTS

WO   WO 2019/016571 A1   1/2019
WO   PCT/US2020/050920   9/2019

OTHER PUBLICATIONS

PCT International Search Report and Written Opinion for PCT/US2020/050920 dated Dec. 22, 2020.

*Primary Examiner* — Jason L Mccormack
(74) *Attorney, Agent, or Firm* — McCarter & English, LLP

(57) ABSTRACT

A system includes, an ion channel extending along a first direction from a first end to a second end. The ion channel is configured to receive ions at the first end of the ion channel. The system further includes a controller configured to apply a first voltage signal to a first plurality of electrodes adjacent to the ion channel. The first plurality of electrodes are configured to generate, based on receipt of the first voltage signal, a first traveling drive potential that travels along the first direction during a separation time. One or more of a travel speed and an amplitude of the first traveling drive potential vary during a first time segment of the separation time.

28 Claims, 11 Drawing Sheets

(56) References Cited

U.S. PATENT DOCUMENTS

2017/0372881 A1 12/2017 Hoyes
2019/0057852 A1* 2/2019 Ibrahim ................ H01J 49/062

* cited by examiner

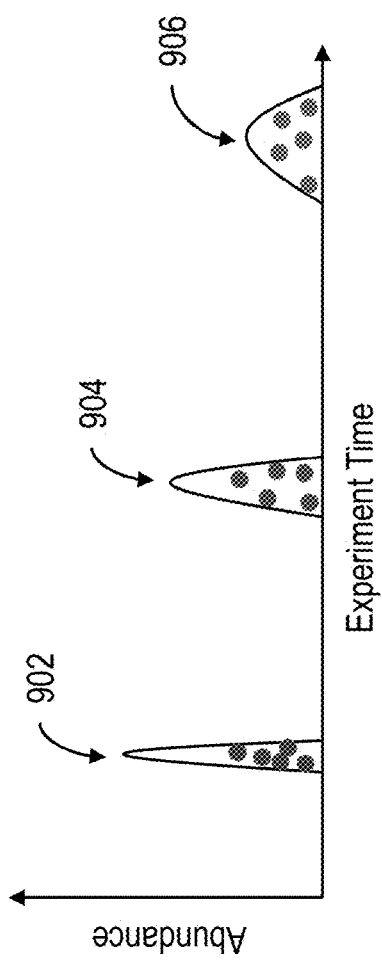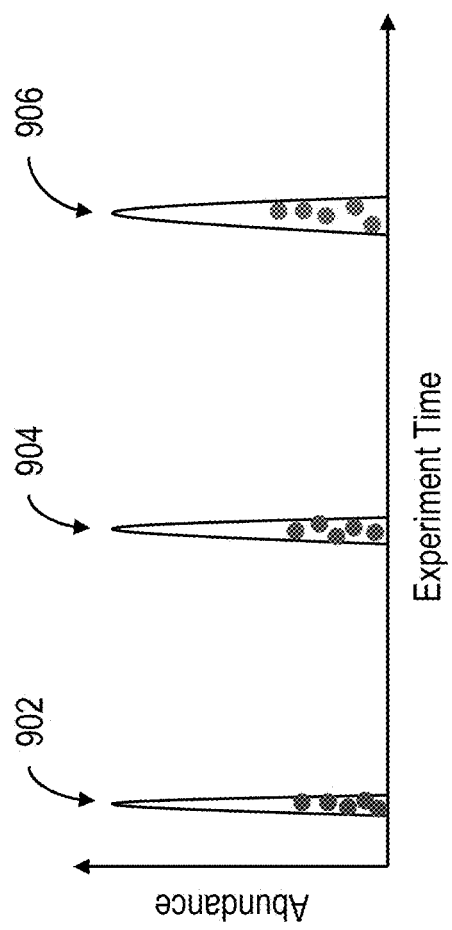

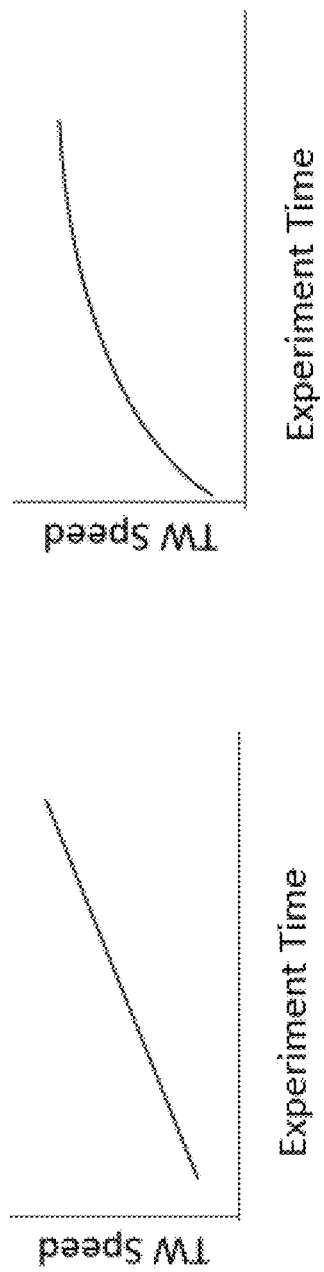
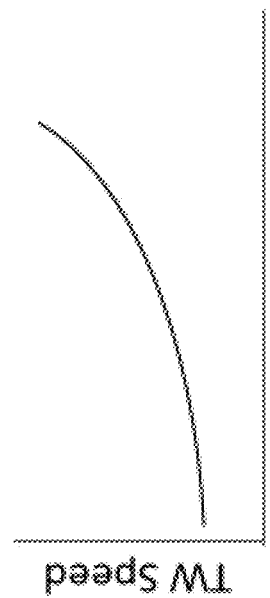
FIG. 7A
FIG. 7B
FIG. 7C

VOLTAGE CONTROL FOR TRAVELING WAVE CHARACTERISTIC VARIATION

CROSS REFERENCE TO RELATED APPLICATIONS

The present application claims the benefit of priority to U.S. Provisional Patent Application No. 62/901,177 filed on Sep. 16, 2019 and entitled Voltage Control for Traveling Wave Characteristic Variation, the disclosure of which is herein incorporated by reference in its entirety.

BACKGROUND

Field of the Invention

The present disclosure is directed to systems and methods for use in ion mobility spectrometry, and more particularly to, system and methods for separating ions based on their mobilities using a traveling drive potential (e.g., waveform) that travels along a first direction during a separation time wherein one or more of a travel speed and an amplitude of the first traveling drive potential vary during a first time segment of the separation time.

Background of the Related Art

Ion mobility spectrometry (IMS) is a technique for separating and identifying ions in the gaseous phase based on their mobilities. For example, IMS can be employed to separate structural isomers and macromolecules that have different mobilities. IMS relies on applying a constant or a time-varying electric field to a mixture of ions within a static or dynamic background gas. An ion having a larger mobility (or smaller collision cross section [CCS]) moves faster under the influence of the electric field compared to an ion with a smaller mobility (or larger CCS). By applying the electric field over a separation distance (e.g., in a drift tube) of an IMS device, ions from an ion mixture can be spatially separated based on their mobility. Because ions with different mobilities arrive at the end of the drift tube at different times (temporal separation) they can be identified based on the time of detection by a detector at the end of the drift tube. Resolution of the mobility separation can be varied by changing the separation distance.

Mass spectrometry (MS) is an analytical technique that can separate a mixture of chemical species based on their mass-to-charge ratio. MS involves ionizing the mixture of chemical species followed by acceleration of the ion mixture in the presence of electric and/or magnetic fields. In some mass spectrometers, ions having the same mass-to-charge ratio undergo the same deflection. Ions with different mass-to-charge ratios can undergo different deflections, and can be identified based on the spatial location of detection by a detector (e.g., electron multiplier).

In prior art IMS systems, as the ion mobility range increases, ion mobility separation using a traveling potential waveform having a constant speed may not result in the most efficient separation over the entire ion mobility range. For example, after separation, ion packets with higher mobility (which arrive earlier) can be narrower compared to ion packets with lower mobility (which arrive later). Therefore, there is a need for IMS systems and methods which provide improved and more efficient separations over time for ion groups having a broad mobility range.

SUMMARY

In general, embodiments of the disclosure provide systems and corresponding methods for voltage control of ion mobility separation.

A method includes providing an ion channel extending along a first direction from a first end to a second end. The method also includes providing ions at the first end of the ion channel. The method further includes applying, by a controller, a first voltage signal to a first plurality of electrodes adjacent to the ion channel. The method also includes generating, by the first plurality of electrodes, a first traveling drive potential that travels along the first direction during a separation time. The generating is based on receipt of the first voltage signal. One or more of a travel speed and an amplitude of the first traveling drive potential vary during a first time segment of the separation time.

In one implementation, the ion channel is defined between a first surface and a second surface adjacent to the first surface. The second surface includes a second plurality of electrodes that includes a first electrode and a second electrode spaced apart from the first electrode along a second direction lateral to the first direction. The first plurality of electrodes are located between the first electrode and the second electrode and arranged along the first direction. In another implementation, the travel speed of the first traveling drive potential decreases during the first time segment. In yet another implementation, the first traveling drive potential has a first speed during a first time sub-segment of the first time segment and a second speed smaller than the first speed during a second time sub-segment of the first time segment. The second time sub-segment occurs after the first time sub-segment.

In one implementation, the travel speed decreases monotonically as a function of separation time. In another implementation, the increase in travel speed is one of linear, quadratic and exponential. In yet another implementation, the travel speed of the first traveling drive potential increases during the first time segment. In one implementation, the first traveling drive potential has a first speed during a first time sub-segment of the first time segment and a second speed larger than the first speed during a second time sub-segment of the first time segment. The second time sub-segment occurs after the first time sub-segment. In another implementation, the travel speed increases monotonically as a function of separation time. In yet another implementation, the increase in travel speed is one of linear, quadratic and exponential.

In one implementation, the separation time includes a second time segment preceding the first time segment. The travel speed of the first drive potential remains fixed during the second time segment. In another implementation, the controller includes a plurality of traveling wave control circuits electrically coupled to the first plurality of electrodes. The plurality of traveling wave control circuits are configured to generate a plurality of traveling wave voltage signals. The first voltage signal includes the plurality of traveling wave voltage signals.

In one implementation, the controller includes a master control circuit communicatively coupled to the plurality of traveling wave control circuits. The method further includes determining, by the master control circuit, one or more of amplitudes and/or frequencies of the plurality of traveling wave voltage signals, and phase differences between one or more traveling wave voltage signals of the plurality of traveling wave voltage signals. The method further includes providing, by the master control circuit, one or more traveling wave control signals to the plurality of traveling wave control circuits. The one or more traveling wave control signals are indicative of one or more of the amplitudes and/or frequencies of the plurality of traveling wave voltage signals, and the phase differences between the one or more traveling wave voltage signals of the plurality of traveling wave voltage signals.

In one implementation, the method further includes determining, by the master control circuit, variation of the travel speed of the first traveling drive potential during a first time segment of the separation time. In another implementation, the method further includes detecting an ion packet of the provided ions exiting the ion channel at the second end, and setting a beginning time of the first time segment based on the detection of the ion packet. In another implementation, lengths of a portion of the first plurality of electrodes decrease along the first direction. In yet another implementation, lengths of a portion of the first plurality of electrodes increase along the first direction.

A system includes, an ion channel extending along a first direction from a first end to a second end. The ion channel is configured to receive ions at the first end of the ion channel. The system further includes a controller configured to apply a first voltage signal to a first plurality of electrodes adjacent to the ion channel. The first plurality of electrodes are configured to generate, based on receipt of the first voltage signal, a first traveling drive potential that travels along the first direction during a separation time. One or more of a travel speed and an amplitude of the first traveling drive potential vary during a first time segment of the separation time.

In one implementation, the ion channel is defined between a first surface and a second surface adjacent to the first surface. The second surface includes a second plurality of electrodes that includes a first electrode and a second electrode spaced apart from the first electrode along a second direction lateral to the first direction. The first plurality of electrodes are located between the first electrode and the second electrode and arranged along the first direction. In another implementation, the travel speed of the first traveling drive potential decreases during the first time segment. In one implementation, the first traveling drive potential has a first speed during a first time sub-segment of the first time segment and a second speed smaller than the first speed during a second time sub-segment of the first time segment. The second time sub-segment occurs after the first time sub-segment.

In one implementation, the travel speed decreases monotonically as a function of separation time. In another implementation, the increase in travel speed is one of linear, quadratic and exponential. In one implementation, the travel speed of the first traveling drive potential increases during the first time segment.

In one implementation, the first traveling drive potential has a first speed during a first time sub-segment of the first time segment and a second speed larger than the first speed during a second time sub-segment of the first time segment. The second time sub-segment occurs after the first time sub-segment. In another implementation, the travel speed increases monotonically as a function of separation time. In one implementation, the increase in travel speed is one of linear, quadratic and exponential.

In one implementation, the separation time includes a second time segment preceding the first time segment. The travel speed of the first drive potential remains fixed during the second time segment. In another implementation, the controller includes a plurality of traveling wave control circuits electrically coupled to the first plurality of electrodes. The plurality of traveling wave control circuits configured to generate a plurality of traveling wave voltage signals, and the first voltage signal includes the plurality of traveling wave voltage signals.

In one implementation, the controller includes a master control circuit communicatively coupled to the plurality of traveling wave control circuits and configured to determine one or more of amplitudes and/or frequencies of the plurality of traveling wave voltage signals, and phase differences between one or more traveling wave voltage signals of the plurality of traveling wave voltage signals. The master control circuit is further configured to provide one or more traveling wave control signals to the plurality of traveling wave control circuits. The one or more traveling wave control signals are indicative of one or more of the amplitudes and/or frequencies of the plurality of traveling wave voltage signals, and the phase differences between the one or more traveling wave voltage signals of the plurality of traveling wave voltage signals.

In one implementation, the master control circuit is further configured to determine variation of the travel speed of the first traveling drive potential during a first time segment of the separation time. In another implementation, the system further includes a detector configured to detect an ion packet of the received ions exiting the ion channel at the second end. The controller is configured to set a beginning time of the first time segment based on the detection of the ion packet. In one implementation, lengths of a portion of the first plurality of electrodes decrease along the first direction. In another implementation, lengths of a portion of the first plurality of electrodes increases along the first direction.

It should be appreciated that the present invention can be implemented and utilized in numerous ways, including without limitation as a process, an apparatus, a system, a device, and a method for applications now known and later developed.

BRIEF DESCRIPTION OF THE FIGURES

These and other features will be more readily understood from the following detailed description taken in conjunction with the accompanying drawings, in which:

FIGS. 5B and 5C illustrate exemplary effect of a decreasing traveling wave speed on the appearance of three separate mobility peaks;

FIGS. 7A-7C illustrate exemplary plots of monotonically increasing speeds of the potential waveform.

Figure 1:
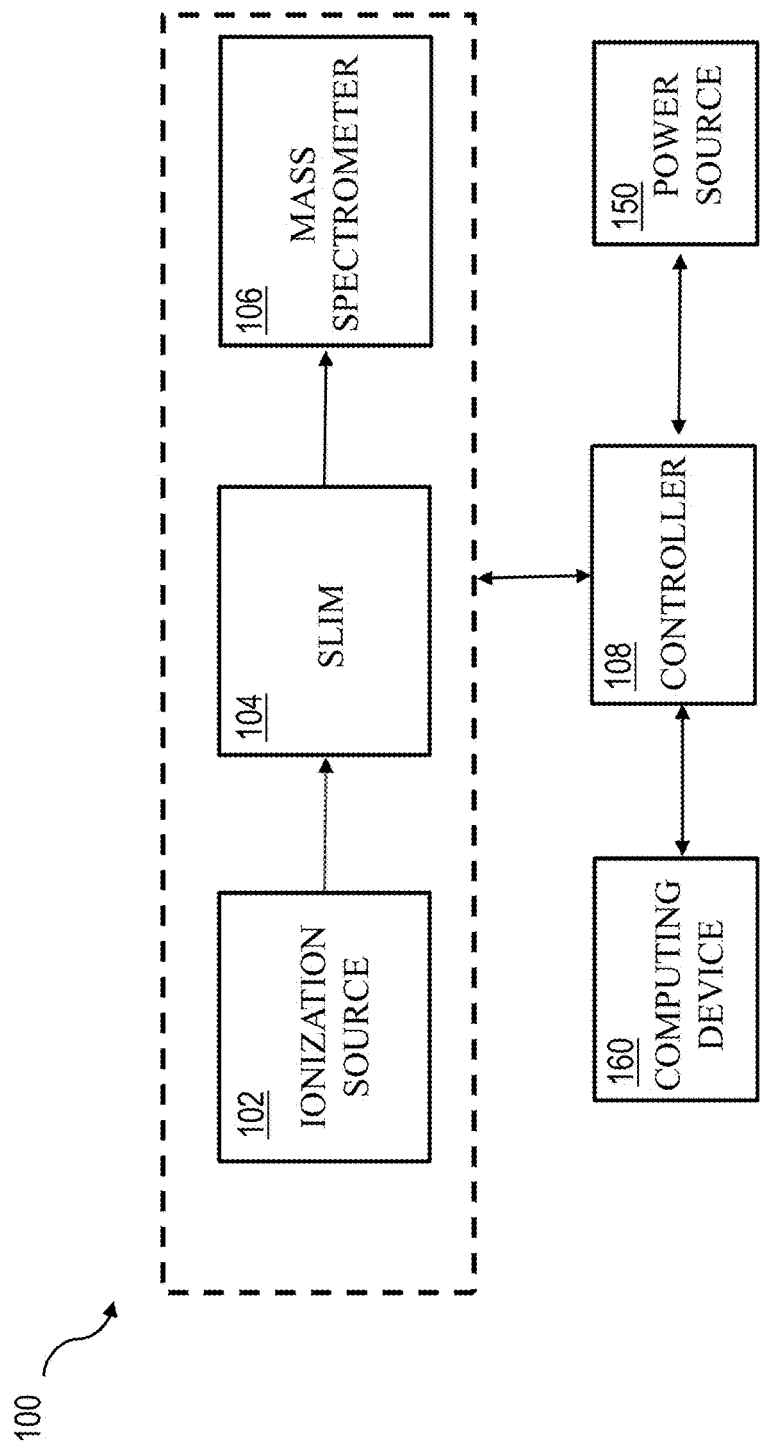
FIG. 1 is a schematic illustration of an exemplary ion mobility separation (IMS) system.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

It will be understood that the disclosed embodiments are merely examples of the way in which certain aspects of the invention can be implemented and do not represent an exhaustive list of all of the ways the invention may be embodied. Indeed, it will be understood that the systems, devices and methods described herein may be embodied in various and alternative forms some of which are described herein. Moreover, as noted above, the figures are not necessarily to scale and some features may be exaggerated or minimized to show details of particular components.

Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

Unless otherwise apparent, or stated, directional references, such as "right," "left," "upper," "lower," "outward," "inward," etc., are intended to be relative to the orientation of a particular embodiment of the invention as shown in the first numbered view of that embodiment. In addition, a given reference numeral indicates the same or similar structure when it appears in different figures and like reference numerals identify similar structural elements and/or features of the subject invention.

Certain exemplary embodiments will now be described to provide an overall understanding of the principles of the structure, function, manufacture, and use of the systems, devices, and methods disclosed herein.

As stated previously, ion mobility spectrometry (IMS) is a commonly used technique for detecting and analyzing ions based on their mobility. For example, IMS can be used to detect biomarkers (e.g., proteins) which can allow for detection of disease signatures. In certain IMS applications, a traveling potential waveform can be applied to a collection of ions of various mobility (e.g., ions generated by an ion source) and can drive ions with different mobility at different speeds resulting in mobility based separation. For example, ions having a mobility greater than the speed of the traveling wave potential can travel with the traveling wave potential (e.g., with ion speeds equal to or greater than the speed of the traveling wave) while ions having a mobility smaller than the speed of the traveling wave potential can fall behind (or slip) relative to the traveling wave. This can result in the generation of ion packets (or ion peaks) having different mobility that are spatially and/or temporally separated.

The speed of the traveling potential waveform can be related to the ion mobility range over which desirable ion mobility separation can be performed (e.g., separated ions have desirable resolution). For a narrow ion mobility range, a desirable speed of the traveling potential waveform that results in efficient ion mobility separation can be determined. As the ion mobility range increases, ion mobility separation by a traveling potential waveform having a constant speed may not result in efficient separation over the entire ion mobility range. For example, after separation, ion packets with higher mobility (which arrive earlier) can be narrower compared to ion packets with lower mobility (which arrive later). This application describes systems and methods for improved ion mobility separation over a broad mobility range by varying the speed of the traveling potential waveform. The variation in speed can be based on the ion mobility range of ions to be separated, and can be predetermined. In some implementations, the variation in the speed of the traveling potential waveform can be synchronized with the arrival of an ion packet (e.g., having relatively higher mobility). This can improve the resolution and sensitivity of ion mobility separation by creating narrower ion packets for ions with lower mobility.

FIG. 1 is a schematic illustration of an exemplary ion mobility separation (IMS) system 100. The IMS system 100 includes an ionization source 102 that can generate ions (e.g., ions having varying mobility and mass-to-charge-ratio) and inject the ions into a SLIM (Structures for Lossless Ion Manipulation) device 104. This can be done at multiple time instances (e.g., periodically). The SLIM device 104 can include one or more surfaces (e.g., made of printed board material) that can include electrodes arranged on the surfaces. The electrodes can receive voltage (or current) signals or waveforms (e.g., DC/RF/AC voltage [or current] signal or a superposition thereof), and can generate a potential waveform (e.g., potential gradient) to confine ions in the SLIM device and/or to guide ions through the SLIM device 104. The potential waveform can travel along the SLIM device 104 and separate ions based on their mobility. A mass spectrometer 106 (or an ion detector) can receive ions from the SLIM device 104 and can perform mass spectroscopy or direct detection on the received ions.

A controller 108 can control the operation of one or more of ion source 102, SLIM device 104 and mass spectrometer 106. The controller 108 can receive power from a power source 150 (e.g., DC power source that provides a DC voltage to the controller 108). The controller 108 can include multiple power supply modules (e.g., current/voltage control circuits) that generate various voltage (or current) signals that drive the electrodes in the SLIM device 104. For example, the controller 108 can include RF control circuits that generate RF voltage (or current) signals, traveling wave control circuits that generate traveling wave voltage (or current) signals, DC control circuits that generate DC voltage (or current) signals, etc. The controller 108 can also include a master control circuit that can control the operation of the RF/traveling wave/DC control circuits. For example, the master control circuit can control the amplitude and/or phase of voltage (or current) signals generated by the RF/traveling wave/DC control circuits to achieve a desirable operation of the SLIM device 104.

In some implementations, the SLIM device 104 can generate a traveling potential waveform (resulting from potentials generated by multiple electrodes in the SLIM device 104) that can perform mobility-based separations. The potential waveform can travel through the SLIM device 104 at a predetermined velocity based on, for example, frequency of voltage signals applied to the electrodes of the SLIM device, 104.

In some implementations, the traveling potential waveform can be spatially periodic and the spatial periodicity can depend on the phase differences between the voltage signals applied to adjacent electrode pairs (e.g., along the direction of propagation of ions in the SLIM device 104). In some implementations, the phase differences can determine the direction of propagation of the potential waveform. The master control circuit can control the frequency and/or phase of voltage outputs of traveling wave control circuits such that the traveling potential waveform has a desirable (e.g., predetermined) amplitude, spatial periodicity and/or speed. The master control circuit can vary the speed of the potential waveform by controlling the frequency and/or phase of the voltage outputs of RF/traveling wave control circuits. The master control circuit can vary (e.g., increase, decrease, etc.) the amplitude of the voltage output of RF/traveling wave control circuits.

In some implementations, the controller 108 can be communicatively coupled to a computing device 160. For example, the computing device 160 can provide operating parameters of the SLIM device 104 via a control signal to the master control circuit. In some implementations, a user can provide the computing device 160 (e.g., via a user interface) with the operating parameters. For example, the user can provide the computing device 160 with information related to variation in the speed of the traveling potential wave. Based on the operating parameters received via the control signal (e.g., information on traveling potential speed variation), the master control circuit can control the operation of the RF/AC/DC control circuits which in turn can determine the operation of the SLIM device 104. In some implementations, the master control circuit can receive/determine the operating parameters (e.g., by executing a predetermined algorithm, accessing a database, receiving from a user, etc.) In some implementations, RF/AC/DC control circuits can be physically distributed over the IMS system 100. For example, one or more of the RF/AC/DC control circuits can be located on the SLIM device 104.

Figure 2:
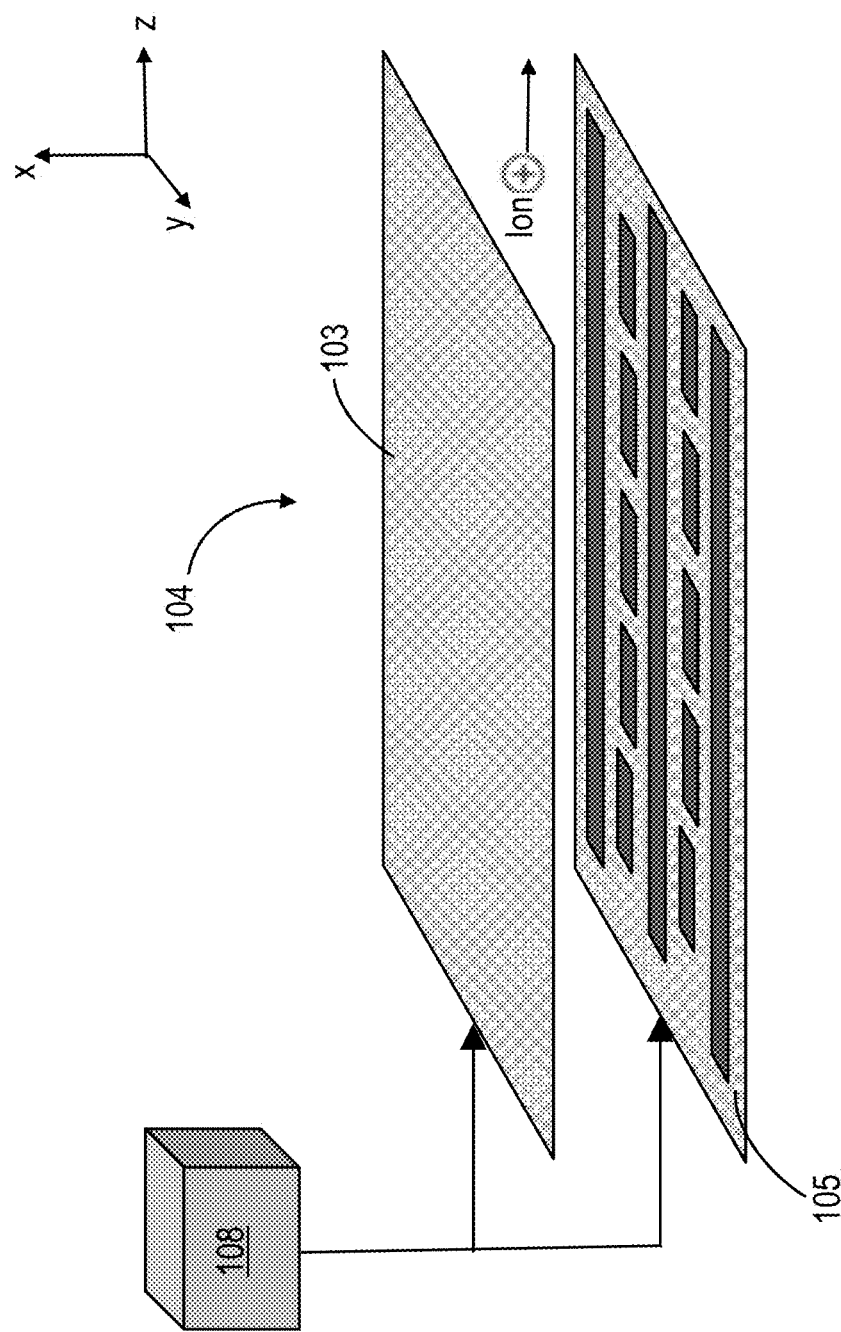
FIG. 2 illustrates an exemplary embodiment of a SLIM device of the IMS system in FIG. 1.

FIG. 2 illustrates an exemplary embodiment of the SLIM device 104. The SLIM device 104 can include a first surface 103 and a second surface 105. The first and second surfaces can be arranged (e.g., parallel to one another) to define one or more ion channels between them. The first surface 103 and second surface 105 can include electrodes (e.g., arranged as arrays of electrodes on the surfaces facing the ion channel). The electrodes on the first surface 103 and second surface 105 can be configured to electrically couple to the controller 108 and receive voltage (or current) signals or waveforms. In some implementations, the first surface 103 and second surface 105 can include a backplane that includes multiple conductive channels that allow for electrical connection between the controller 108 and the electrodes on the first surface 103 and second surface 105. In some implementations, the number of conductive channels can be fewer than the number of electrodes. In other words, multiple electrodes can be connected to a single electrical channel. As a result, a given voltage (or current) signal can be transmitted to multiple electrodes simultaneously. Based on the received voltage (or current) signals, the electrodes can generate one or more potentials (e.g., a superposition of various potentials) that can confine, drive and/or separate ions along a propagation axis (e.g., z-axis).

Figure 3:
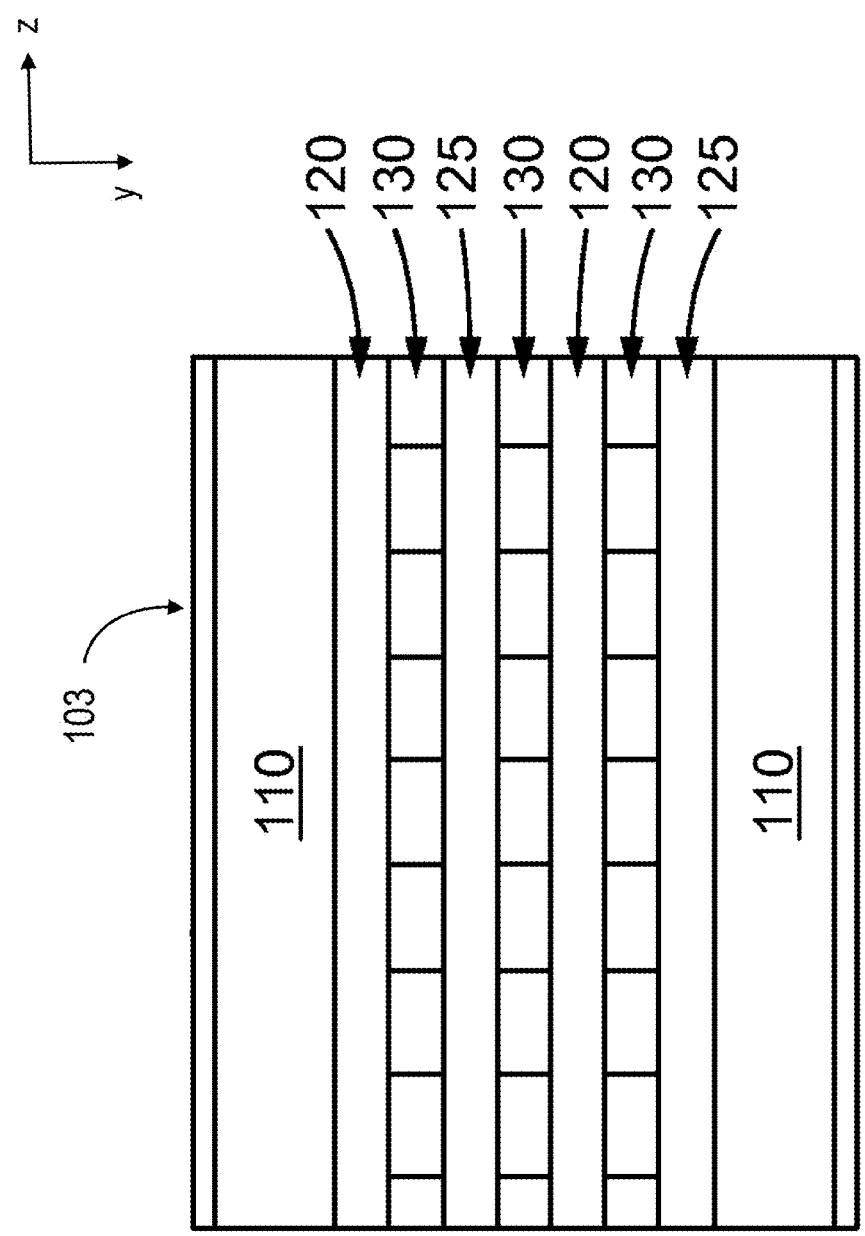
FIG. 3 illustrates an exemplary arrangement of electrodes on a surface of the SLIM device in FIG. 2.

The first and the second surfaces 103 and 105 can include a plurality of electrodes. FIG. 3 illustrates an exemplary arrangement of electrodes on the first surface 103. Although the electrode arrangement on the first surface 103 is described below, second surface 105 can include electrodes with similar electrode arrangement. The first surface 103 includes a first plurality of electrodes 120 and 125 that can receive voltage (or current) signals (or are connected to ground potential) and can generate a pseudopotential that can prevent/inhibit ions from approaching the first surface 103. The first plurality of electrodes 120 and 125 can be rectangular and the longer edge of the rectangle can be arranged along the direction of propagation of ions undergoing mobility separation ("propagation axis"). For example, in FIG. 3, the propagation axis is parallel to the z-axis. The first plurality of electrodes can be separated from each other along a lateral direction (e.g., along the y-axis). For example, the lateral direction can be perpendicular (e.g. the y axis) to the propagation axis (e.g. the z axis).

The first surface 103 can include a second plurality of electrodes 130 that can be located between the electrodes of the first plurality of electrodes (e.g., in the space between the first plurality of electrodes 120 and 125). The second plurality of electrodes 130 can include multiple electrodes that are segmented/arranged along (or parallel to) the propagation axis. The second plurality of electrodes 130 can receive a second voltage signal and generate a drive potential that can drive ions along the propagation axis. The drive potential can lead to separation of ions based on their mobility as they move along the propagation axis.

The first surface can also include guard electrodes 110 that are positioned adjacent to the outer most of the first/second plurality of electrodes. For example, the guard electrodes 110 can be located at the edges of the first surface 103 along the lateral direction. The guard electrodes 110 can receive a voltage signal (e.g., DC voltage signal from a DC control circuit) and generate a guard potential that can confine ions in the ion channels between the guard electrodes along the lateral direction.

The first plurality of electrodes, the second plurality of electrodes, and the guard electrodes can be connected to one or more voltage control circuits (e.g., voltage control circuits in the controller 108). In some implementations, first plurality of electrodes 120 and 125 can receive radio frequency (RF) signals that are phase shifted with respect to each other. In some implementations, the master control circuit can control the operation of two RF control circuits to generate two RF voltage signals that are phase shifted from one another.

Figure 4:
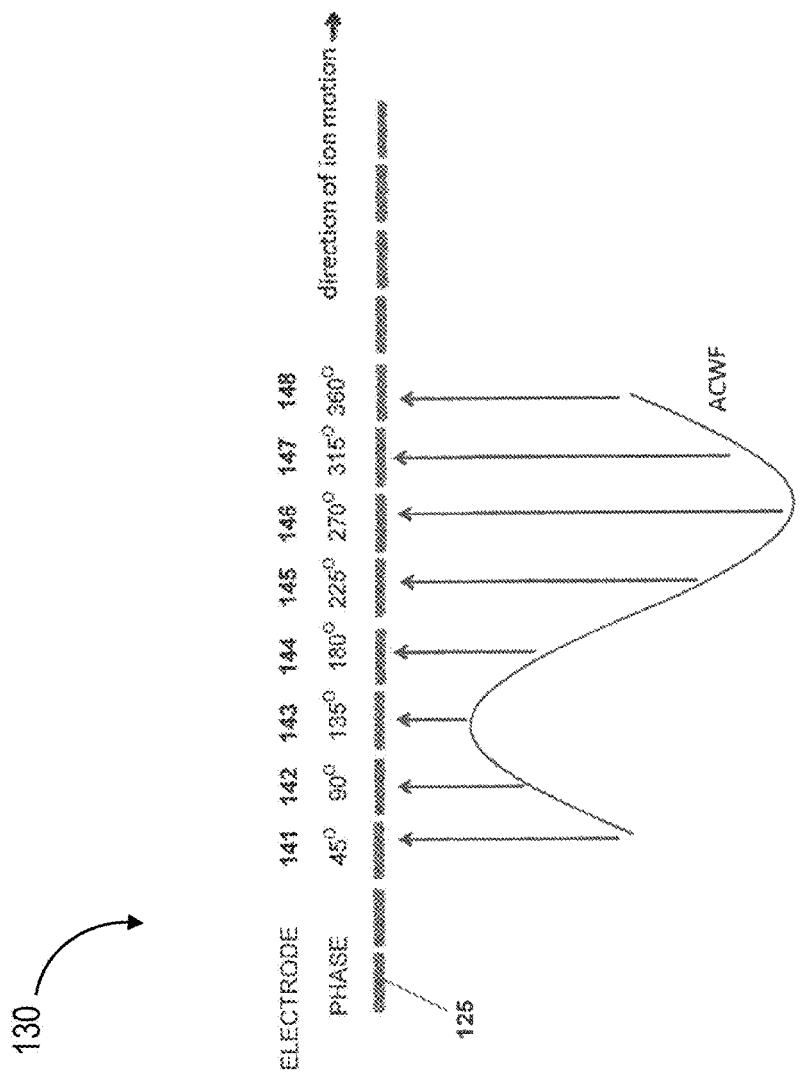
FIG. 4 illustrates an exemplary voltage waveform applied to electrodes of a SLIM device that can drive ions in the SLIM device.

FIG. 4 illustrates an exemplary voltage waveform that can be applied to the second plurality of electrodes 130 comprising electrodes 141-148 in repeating pattern (e.g., every eight electrodes receive similar voltage signal). For example, the voltage waveform can include multiple voltage signals that are simultaneously applied to the electrodes 141-148. The exemplary voltage waveform in FIG. 4 is a sinusoidal waveform (e.g., AC voltage waveform). The electrodes 141-148 can receive voltage signals whose amplitudes can be determined based on the voltage waveform (e.g., sinusoidal waveform, rectangular waveform, sawtooth waveform, biased sinusoidal waveform, etc.). For example, if a single wavelength of the AC voltage waveform extends over 8 electrodes (141-148), amplitudes of the voltage signals applied to the electrodes 141-148 can be determined by selecting values from the AC waveform for phase shifts corresponding to the total number of electrodes (e.g., 8 electrodes) associated with a single wavelength. For example, the phase shift between adjacent electrodes of the electrodes 141-148 is 45 degrees (360 degrees [corresponding to a single wavelength] divided by 8). This can be achieved by electrically coupling electrodes 141-148 to different traveling wave control circuit (e.g., AC control circuits, pulsed current control circuits, etc.) that generate voltage signals that are phase shifted with respect to each other. Alternately, a single traveling wave control circuit can generate voltage signals that can be simultaneously applied to the electrodes 141-148. In some implementations, the voltage/current waveform can take various pulse shapes (e.g., square, triangular, rectangular, sawtooth, etc.), can be periodic, can be aperiodic, etc. For example, the traveling wave control circuit can include one or more DC control circuits that generate DC voltage signals and AC control circuits that generate sinusoidal signals.

In some implementations, the traveling wave control circuit can include one or more pulsed voltage (or current) control circuits that can generate a pulsed voltage (or current) waveform (e.g., square, triangular, rectangular, sawtooth, etc.). The pulsed voltage (or current) control circuits can include multiple outputs that are electrically connected to multiple electrodes (e.g., electrodes 141-148). In some implementations, a pulsed voltage (or current) control circuit can simultaneously apply multiple voltage signals (e.g., that constitute the pulsed waveform) to the multiple electrodes simultaneously. The various pulse shapes of the voltage (or current) waveform can be generated by a superposition of DC voltage signals and sinusoidal signals. The master control circuit can determine the phase shift between the voltage signals generated by the various traveling wave control circuits. The shape/periodicity of the traveling potential waveform can be based on the phase shift between the voltage signals applied to adjacent electrodes. The master control signal can determine the amplitudes of the DC voltage signals generated by DC control circuits. The master control circuit can determine the amplitude and/or frequency of the AC signal generated by the traveling wave control circuits.

In some implementations, the frequency of the voltage signals (e.g., AC signal) can determine the speed of the traveling potential waveform. An alternate approach to generating phase shifted AC signals for the voltage (or current) waveform (which generates the traveling potential waveform) is the use of multiphase transformers. This approach can provide control of the phase relationships between multiple voltage output signals based upon the connection scheme of the multiple secondary windings of the transformer. In this way, one or more input drive voltage(s) signal can be used to generate multiple phase dependent outputs with only analog circuitry. A key differentiation between this approach and the digital generation methods described above is the fact that the phase dependence can be dictated by the physical wiring of the transformer and may not be changed without making a physical change to the wiring. The phase relationships between digitally generated waveforms can be dynamically varied without a change in hardware.

As time progresses, the potential waveform (e.g., generated by AC waveform, sinusoidal voltage waveform, pulsed voltage [or current] waveform applied to the electrodes) can travel along the direction of propagation. This can result in a change in the amplitude of the voltage applied to the electrodes 141-148. For example, the voltage applied to a first electrode (e.g., electrode 141) during a first time step is applied to the adjacent electrode (e.g., electrode 142) during the next time step. The controller 108 can include one or more traveling wave control circuits that can generate the pulsed voltage/current waveform, AC waveform, etc. In some implementations, the controller can include one or more RF control circuits that can generate an RF voltage waveform.

The controller 108 can control the speed of the traveling potential waveform by controlling the frequency and/or phase of the AC/RF/pulsed voltage (or current) waveform applied to the electrodes (e.g., plurality of electrodes 130). As the potential waveform travels, ions introduced in the SLIM device 104 can be pushed along the direction of propagation and separated based on their mobility. For example, the ions can be separated spatially into ion packets based on their mobility. Ion packet with higher mobility can exit the SLIM device prior to ion packets with lower mobility.

Figure 5A:
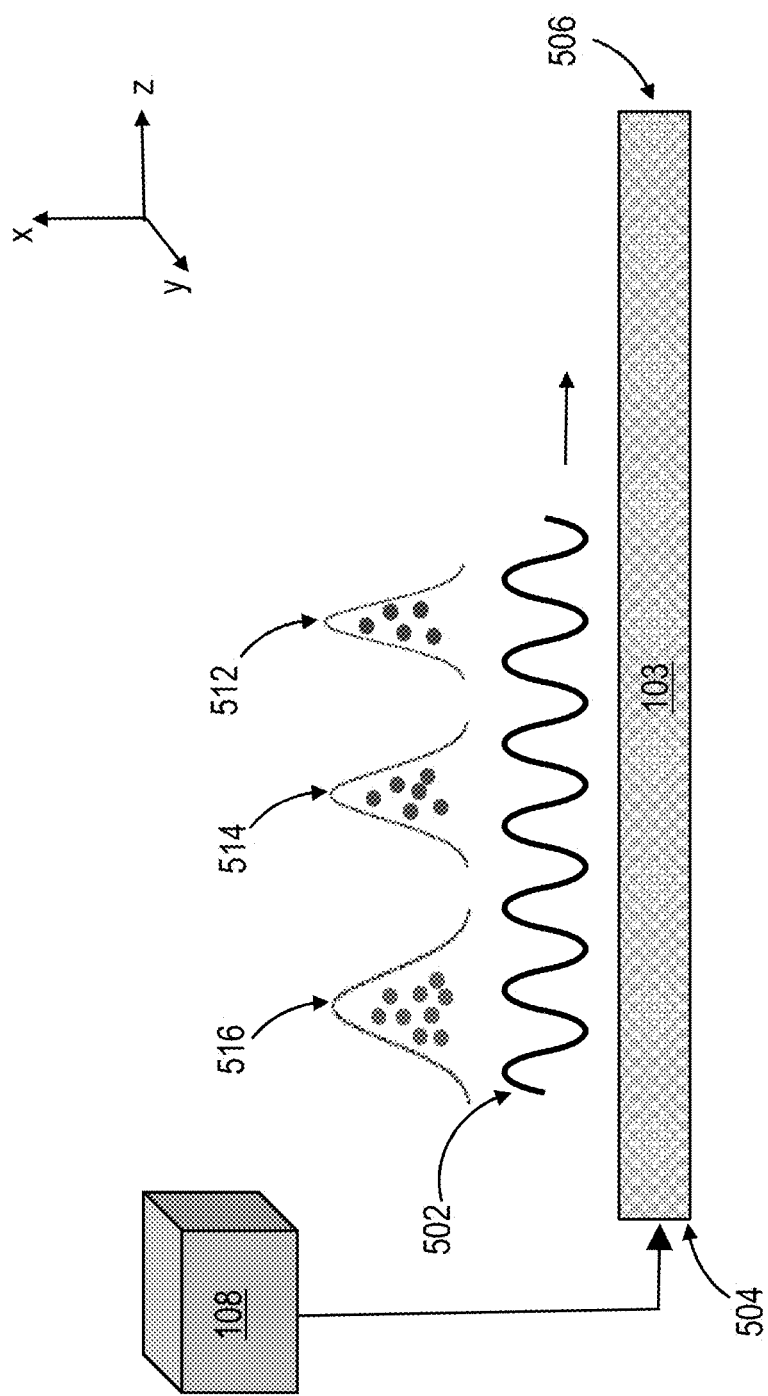
FIG. 5A illustrates an exemplary separation of ions based on their mobility.

FIG. 5A illustrates an exemplary mobility separation of ions. The electrodes of the first surface 103 can generate a potential waveform 502 that can travel from a first end 504 to the second end 506. As the potential waveform 502 travels, the ions in the SLIM device 104 (e.g., provided in the ion channel between the first surface 103 and second surface 105) can be separated into ion packets 512, 514 and 516. The mobility of ions in the ion packet 512 is higher than the mobility of ions in the ion packet 514, and the mobility of ions in the ion packet 514 is higher than the mobility of ions in the ion packet 516. Additionally, the ion packets have different packet widths. The width of the ion packet can be inversely proportional to the mobility of ions in the packet. For example, the width of the ion packet 512 can be smaller than the width of the ion packet 514 which can be smaller than the width of the ion packet 516. This can be due to an increase in diffusion of ions of lower mobility. For example, ions with mobility similar to the speed of the traveling potential waveform can travel with the potential waveform. As a result, these ions can be bunched together as they propagate which results in narrower ion packet widths. On the other hand, ions with mobility smaller than the speed of the traveling potential waveform cannot keep up with the traveling potential waveform. As a result, these ions can slip relative to the traveling potential waveform. The slippage can be proportional to the difference between the ion mobility and waveform speed (e.g., nonlinearly relationship). This can lead to dispersion/broadening of the ion packets. As shown in FIG. 5A, the broadening of ion packets is proportional to the mobility of the ions in the ion packet: ion packet 512 suffers from the least amount of broadening and the ion packet 516 suffers from the most broadening.

The broadening of ion packets can be undesirable as it can lead to reduction in the resolution of mobility detection of ions by the SLIM device 104. As a result, the probability of misidentifying an ion ("false positive") can increase. On the other hand, reducing the width of the ion packets (or narrowing) can improve the accuracy of mobility based ion detection. Reducing the width can also increase the sensitivity of ion detection process by generating a larger flux of ions (e.g., ions detected by the ion detector per unit time). As a result, for a fixed noise level, the signal-to-noise ratio of ion detection can increase as the width of the ion packet decreases.

The broadening of ion packets with ions of lower mobility (e.g., ion packet 514, 516) can be reduced by varying the speed of the traveling potential during the separation of the ions ("separation time" or "experiment time"). The variation in the speed can occur when an ion packet with high mobility ions (e.g., ion packet 512) exits the SLIM device 104. For example, before an ion packet has exited the SLIM device 104 (e.g., during a fixed speed segment of the separation time) the traveling potential can travel at a fixed speed. After the ion packet 512 exits the SLIM device 104 and is detected by the mass spectrometer 106, the controller 108 can begin varying the speed of the traveling potential waveform. In some implementations, the mass spectrometer 106 can send a signal to the controller 108 that the ion packet has been received. After receiving the signal, the controller 108 (e.g., master control circuit in the controller 108) can vary the speed of the travel potential waveform (e.g., during a speed variation segment of the separation time).

The variation in speed as a function of separation time can be predetermined. In some implementations, desirable variation in the speed of the potential waveform can be determined by performing multiple (e.g., iterative) mobility separations for a given sample (that includes ions of various mobilities) for multiple speed variations. This can include varying the initial and/or final speed of the potential waveform and/or varying the change in the speed of the potential waveform between the initial and final speeds. For the various mobility separation events, the mobility-based broadening of ion packets can be detected and used to select the desirable speed variation of the potential waveform. For example, the width of some ion packets ("calibrating ion packets") can be determined. In some implementations, a calibrating algorithm can determine the desirable variation in speed of the potential waveform based on the width of ion packets for various iterations of mobility separation. For example, the desirable speed variation (e.g., speed of the potential waveform during the various times between the initial time associated with the initial speed and the final time associated with final speed) can be generated by fitting predetermined parameters to data indicative of the width of calibrating ion packets for various iterations or mobility separation events.

The speed/amplitude variation can depend on the mobility range of the ions over which mobility separation is to be performed. In some implementations, speed/amplitude variations can be obtained by interpolating or extrapolating previously calibrated data. For example, the previously calibrated data can include amplitude/speed data of a mobility range different from that of the ions for which mobility separation is to be performed. Typically, calibration parameters are specific to a given mobility range over which the calibration was performed. If method parameters are changed which alter the range of mobilities to be analyzed then the calibration process should be repeated to achieve optimal performance. However, appropriate calibration parameters can be estimated from more general fitted calibration parameters via interpolation or extrapolation.

FIGS. 5B and 5C illustrate the effect of a decreasing traveling wave speed on the appearance of three separate mobility peaks. In FIG. 5B, these peaks become broader and lower intensity as the experiment time increases. However, as shown in FIG. 5C, a similar peak intensity and width can be retained across the time domain by compensating for changes in each ion's mobility by varying the traveling wave speed. Because ions exiting the separation channel later have lower mobilities, they will tend to travel faster and create sharper peaks when the travelling wave speed is better matched to their mobility. This ultimately results in an improvement to the sensitivity and resolution with which these peaks can be detected.

Figure 6A:
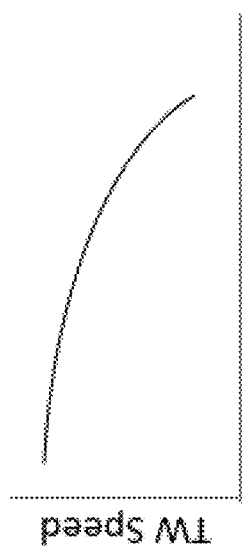
FIGS. 6A-6D illustrate exemplary plots of monotonically decreasing speeds of the potential waveform.
Figure 6B:
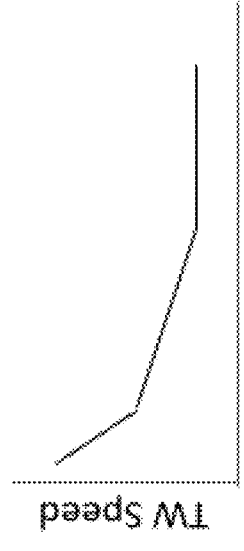
Figure 6C:
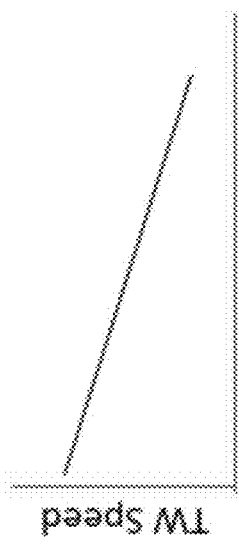
Figure 6D:
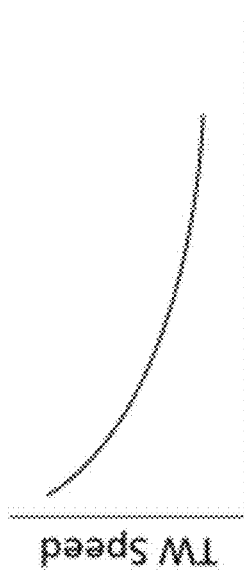

The speed variation can result in a decrease in the speed of the potential waveform (final speed is smaller than the initial speed). FIGS. 6A-6D illustrates exemplary plots of monotonically decreasing speeds of the potential waveform. FIG. 6A is a plot illustrating a linear decrease in the speed of the potential waveform. FIG. 6B is a plot illustrating a quadratic decrease in the speed of the potential waveform. FIG. 6C is a plot illustrating an exponential decrease in the speed of the potential waveform. FIG. 6D is a plot illustrating a piecewise linear decrease in the speed of the potential waveform. In other words, the slope of decrease can be different for different segments of separation time. As illustrated in FIG. 6D, the slope progressively decreases with separation time.

Figure 8:
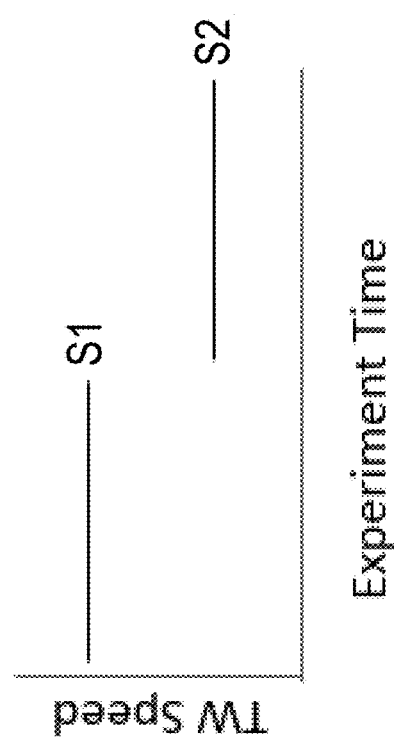
FIG. 8 illustrates an exemplary plot of piecewise constant speed of the potential waveform.

FIGS. 7A-7C illustrates exemplary plots of monotonically increasing speeds of the potential waveform. FIG. 7A is a plot illustrating a linear increase in the speed of the potential waveform. FIG. 7B is a plot illustrating a quadratic increase in the speed of the potential waveform. FIG. 7C is a plot illustrating an exponential increase in the speed of the potential waveform. Those skilled in the art would readily appreciate that there could also be a piecewise liner increase in the speed of the potential waveform (e.g. the inverse of FIG. 6D). FIG. 8 illustrates an exemplary plot of piecewise constant speed of the potential waveform. During the first duration of the separation time, the speed is a constant higher speed S1 and during the second duration of the separation time, the speed is a constant lower speed S2. In some implementations, varying the amplitude/speed of the travelling wave can vary (e.g., increase, decrease, etc.) the range of mobility over which desirable separation can be performed or can allow for analyzing a certain range of mobility over a shorter period of time.

Figure 9:
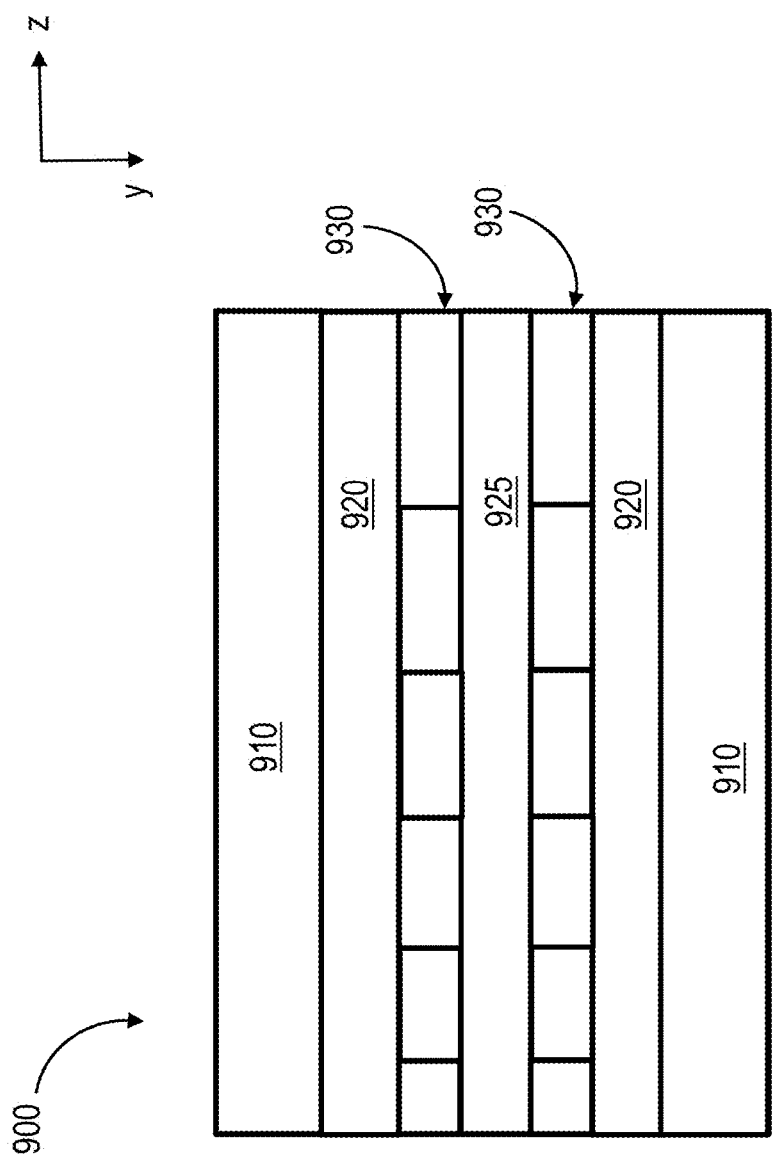
FIG. 9 illustrates an exemplary arrangement of electrodes on a surface of the SLIM device in FIG. 2.

In some implementations, the speed of the traveling wave can be varied without changing the frequency of the voltage signals (e.g., AC/pulsed voltage signals) associated with the traveling potential waveform. This can be achieved by varying the size of the electrodes to which the voltage signals are applied (e.g., plurality of electrodes 130). FIG. 9 illustrates an exemplary surface 900 that can include an electrode arrangement (e.g., first surface 103/second surface 105 of the SLIM device in FIG. 2). The surface 900 includes a first plurality of electrodes 920 and 925 that can receive voltage (or current) signals (or are connected to ground potential) and can generate a pseudopotential that can prevent/inhibit ions from approaching the surface 900. The first plurality of electrodes 120 and 125 can be rectangular and the longer edge of the electrode can be arranged along the direction of propagation of ions undergoing mobility separation ("propagation axis"). For example, in FIG. 9, the propagation axis is parallel to the z-axis. The first plurality of electrodes can be separated from each other along a lateral direction (e.g., along the y-axis). For example, the lateral direction can be perpendicular to the propagation axis (e.g. the z axis).

The surface 900 can include a second plurality of electrodes 930 that can be located between the electrodes of the first plurality of electrodes (e.g., in the space between the first plurality of electrodes 920 and 925). The second plurality of electrodes 930 can include multiple electrodes that are segmented/arranged along (or parallel to) the propagation axis. The second plurality of electrodes can generate the traveling potential waveform. As illustrated in FIG. 9, the length of the second plurality of electrodes 930 increases along the propagation axis (from left to right along +z direction). As a result, applying voltage signals having same or similar frequencies to the second plurality of electrodes can result in generation of a traveling waveform whose speed increases from left to right along the +z direction.

Figure 10:
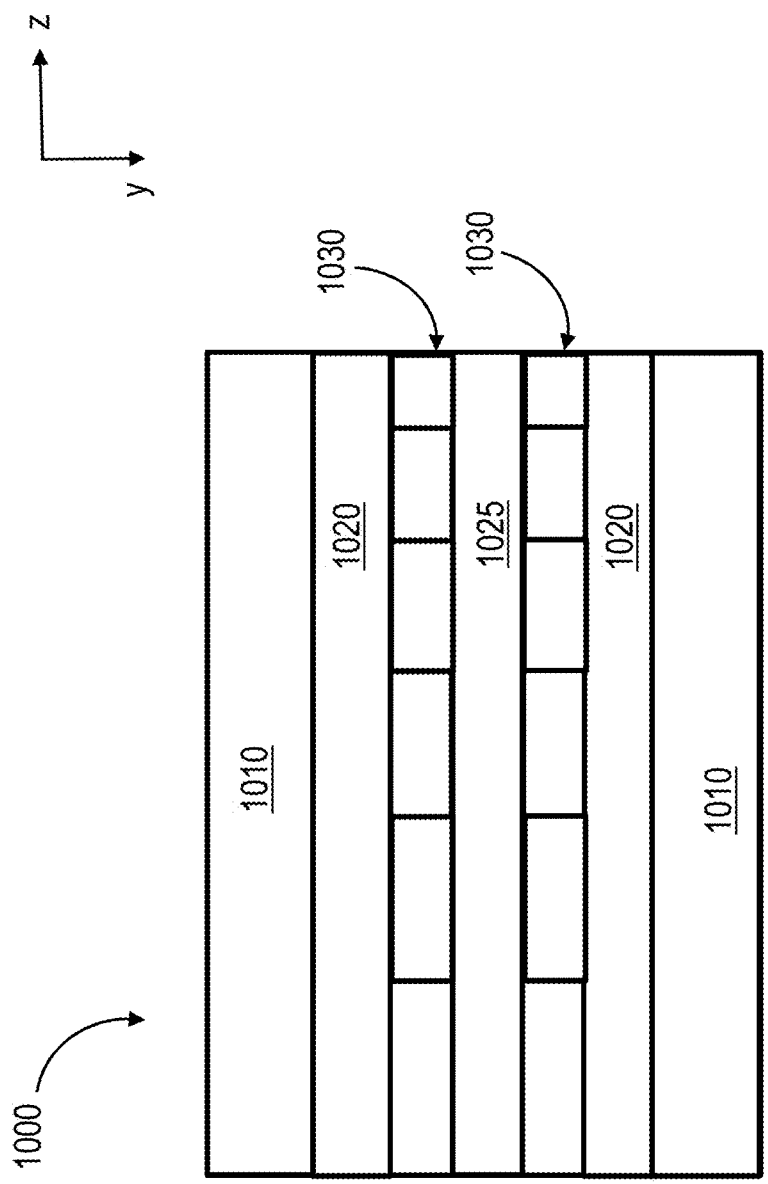
FIG. 10 illustrates another exemplary arrangement of electrodes on a surface of the SLIM device in FIG. 2.

FIG. 10 illustrates an exemplary surface 1000 that can include an electrode arrangement (e.g., first surface 103/second surface 105 of the SLIM device in FIG. 2). The surface 1000 includes a first plurality of electrodes 1020 and 1025 that can receive voltage (or current) signals (or are connected to ground potential) and can generate a pseudopotential that can prevent/inhibit ions from approaching the surface 1000. The first plurality of electrodes 1020 and 1025 can be rectangular and the longer edge of the rectangle can be arranged along the direction of propagation of ions undergoing mobility separation ("propagation axis"). For example, in FIG. 10, the propagation axis is parallel to the z-axis. The first plurality of electrodes can be separated from each other along a lateral direction (e.g., along the y-axis). For example, the lateral direction can be perpendicular to the propagation axis (e.g. the z axis).

The surface 1000 can include a second plurality of electrodes 1030 that can be located between the electrodes of the first plurality of electrodes (e.g., in the space between the first plurality of electrodes 1020 and 1025). The second plurality of electrodes 1030 can include multiple electrodes that are segmented/arranged along (or parallel to) the propagation axis. The second plurality of electrodes 1030 can generate the traveling potential waveform. As illustrated in FIG. 10, the length of the second plurality of electrodes 1030 decreases along the propagation axis (from left to right along +z direction). As a result, applying voltage signals having same or similar frequencies to the second plurality of electrodes 1030 can result in generation of a traveling waveform whose speed decreases from left to right along the +z direction.

Other embodiments are within the scope and spirit of the disclosed subject matter. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure. Further, in the present disclosure, like-named components of the embodiments generally have similar features, and thus within a particular embodiment each feature of each like-named component is not necessarily fully elaborated upon.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor can receive instructions and data from a read-only memory or a random access memory or both. The essential elements of a computer are a processor for executing instructions and one or more memory devices for storing instructions and data. Generally, a computer can also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

What is claimed is:

1. A method comprising:
    providing an ion channel extending along a first direction from a first end to a second end;
    providing ions at the first end of the ion channel;
    applying, by a controller, a first voltage signal to a first plurality of electrodes adjacent to the ion channel,
    generating, by the first plurality of electrodes, a first traveling drive potential that travels along the first direction during a separation time, the generating based on receipt of the first voltage signal; and
        wherein one or more of a travel speed and an amplitude of the first traveling drive potential varies during a first time segment of the separation time;
        wherein the ion channel is defined between a first surface and a second surface adjacent to the first surface, wherein the second surface comprising:
        a second plurality of electrodes which includes a first electrode and a second electrode spaced apart from the first electrode along a second direction lateral to the first direction, wherein the first plurality of electrodes are located between the first electrode and the second electrode and arranged along the first direction;
        wherein the controller includes a plurality of traveling wave control circuits electrically coupled to the first plurality of electrodes, the plurality of traveling wave control circuits configured to generate a plurality of traveling wave voltage signals, the first voltage signal includes the plurality of traveling wave voltage signals;
        wherein the controller includes a master control circuit communicatively coupled to the plurality of traveling wave control circuits; and
    determining, by the master control circuit, one or more of amplitudes and/or frequencies of the plurality of traveling wave voltage signals, and phase differences between one or more traveling wave voltage signals of the plurality of traveling wave voltage signals; and
    providing, by the master control circuit, one or more traveling wave control signals to the plurality of traveling wave control circuits, wherein the one or more traveling wave control signals are indicative of one or more of the amplitudes and/or frequencies of the plurality of traveling wave voltage signals, and the phase differences between the one or more traveling wave voltage signals of the plurality of traveling wave voltage signals.

2. The method of claim 1, wherein the travel speed of the first traveling drive potential decreases during the first time segment.

3. The method of claim 2, wherein the first traveling drive potential has a first speed during a first time sub-segment of the first time segment and a second speed smaller than the first speed during a second time sub-segment of the first time segment, the second time sub-segment occurs after the first time sub-segment.

4. The method of claim 2, wherein the travel speed decreases monotonically as a function of separation time.

5. The method of claim 4, wherein the increase in travel speed is one of linear, quadratic and exponential.

6. The method of claim 1, wherein the travel speed of the first traveling drive potential increases during the first time segment.

7. The method of claim 6, wherein the first traveling drive potential has a first speed during a first time sub-segment of the first time segment and a second speed larger than the first speed during a second time sub-segment of the first time segment, the second time sub-segment occurs after the first time sub-segment.

8. The method of claim 6, wherein the travel speed increases monotonically as a function of separation time.

9. The method of claim 8, wherein the increase in travel speed is one of linear, quadratic and exponential.

10. The method of claim 1, wherein the separation time includes a second time segment preceding the first time segment, the travel speed of the first drive potential remains fixed during the second time segment.

11. The method of claim 1, further comprising determining, by the master control circuit, variation of the travel speed of the first traveling drive potential during a first time segment of the separation time.

12. The method of claim 11, further comprising:
    detecting an ion packet of the provided ions exiting the ion channel at the second end; and
    setting a beginning time of the first time segment based on the detection of the ion packet.

13. The method of claim 2, wherein lengths of a portion of the first plurality of electrodes decrease along the first direction.

14. The method of claim 8, wherein lengths of a portion of the first plurality of electrodes increase along the first direction.

15. A system comprising:
    an ion channel extending along a first direction from a first end to a second end, the ion channel configured to receive ions at the first end of the ion channel; and
    a controller configured to apply a first voltage signal to a first plurality of electrodes adjacent to the ion channel,
        wherein the first plurality of electrodes are configured to generate, based on receipt of the first voltage signal, a first traveling drive potential that travels along the first direction during a separation time, and
        wherein one or more of a travel speed and an amplitude of the first traveling drive potential varies during a first time segment of the separation time;
        wherein the ion channel is defined between a first surface and a second surface adjacent to the first surface, wherein the second surface includes a second plurality of electrodes including a first electrode and a second electrode spaced apart from the first electrode along a second direction lateral to the first direction,
- wherein the first plurality of electrodes are located between the first electrode and the second electrode and arranged along the first direction;
- wherein the controller includes a plurality of traveling wave control circuits electrically coupled to the first plurality of electrodes, the plurality of traveling wave control circuits configured to generate a plurality of traveling wave voltage signals, the first voltage signal includes the plurality of traveling wave voltage signals; and
- wherein the controller includes a master control circuit communicatively coupled to the plurality of traveling wave control circuits, the master control circuit configured to:
  determine one or more of amplitudes and/or frequencies of the plurality of traveling wave voltage signals, and phase differences between one or more traveling wave voltage signals of the plurality of traveling wave voltage signals; and
  provide one or more traveling wave control signals to the plurality of traveling wave control circuits, wherein the one or more traveling wave control signals are indicative of one or more of the amplitudes and/or frequencies of the plurality of traveling wave voltage signals, and the phase differences between the one or more traveling wave voltage signals of the plurality of traveling wave voltage signals.

16. The system of claim 15, wherein the travel speed of the first traveling drive potential decreases during the first time segment.

17. The system of claim 16, wherein the first traveling drive potential has a first speed during a first time sub-segment of the first time segment and a second speed smaller than the first speed during a second time sub-segment of the first time segment, the second time sub-segment occurs after the first time sub-segment.

18. The system of claim 16, wherein the travel speed decreases monotonically as a function of separation time.

19. The system of claim 18, wherein the increase in travel speed is one of linear, quadratic and exponential.

20. The system of claim 15, wherein the travel sped of the first traveling drive potential increases during the first time segment.

21. The system of claim 20, wherein the first traveling drive potential has a first speed during a first time sub-segment of the first time segment and a second speed larger than the first speed during a second time sub-segment of the first time segment, the second time sub-segment occurs after the first time sub-segment.

22. The system of claim 20, wherein the travel speed increases monotonically as a function of separation time.

23. The system of claim 22, wherein the increase in travel speed is one of linear, quadratic and exponential.

24. The system of claim 15, wherein the separation time includes a second time segment preceding the first time segment, the travel speed of the first drive potential remains fixed during the second time segment.

25. The system of claim 15, wherein the master control circuit is further configured to determine variation of the travel speed of the first traveling drive potential during a first time segment of the separation time.

26. The system of claim 25, further comprising a detector configured to detect an ion packet of the received ions exiting the ion channel at the second end, wherein the controller is configured to set a beginning time of the first time segment based on the detection of the ion packet.

27. The system of claim 16, wherein lengths of a portion of the first plurality of electrodes decreases along the first direction.

28. The system of claim 22, wherein lengths of a portion of the first plurality of electrodes increases along the first direction.

* * * * *